United States Patent [19]

Sawyer

[11] 4,215,246

[45] Jul. 29, 1980

[54] DIAL PULSE SIGNALING ARRANGEMENT

[75] Inventor: Albert J. Sawyer, Lisle, Ill.

[73] Assignee: Bell Telephone Laboratories, Incorporated, Murray Hill, N.J.

[21] Appl. No.: 958,699

[22] Filed: Nov. 8, 1978

[51] Int. Cl.² .......................................... H04M 3/42
[52] U.S. Cl. ................................. 179/18 B; 179/2 A; 179/16 EC; 179/18 FG
[58] Field of Search ............ 179/18 B, 18 BB, 18 BE, 179/18 AH, 16 EC, 18 DA, 2 A, 175.2 A, 18 FG, 18 FF

[56] References Cited

U.S. PATENT DOCUMENTS 4,064,372  12/1977  Altenburger .................. 179/18 DA

FOREIGN PATENT DOCUMENTS 2302858  7/1974  Fed. Rep. of Germany ..... 179/18 DA
44-29401 12/1969  Japan ................................ 179/16 EC

*Primary Examiner*—Thomas W. Brown
*Attorney, Agent, or Firm*—Kamstra H. Samples

[57] ABSTRACT

A telecommunication system including a rotary dial subscriber set for transmitting sequences of dial pulses to a telephone central office over at least two conductors is disclosed. In response to a first set of dialed digits, the central office establishes a DC conductive path between the subscriber set and a DC blocking trunk circuit. A central office scan arrangement is connected to the communication path to determine the conduction state between the conductors of the communication path in order to maintain or remove the communication path. The system also includes a dial pulse detector which detects and counts dial pulses in each sequence of dial pulses transmitted from the subscriber set. In response to the first dial pulse of each sequence, the dial pulse detector generates signals which are utilized to inhibit the central office scanner from detecting further dial pulses. After each dial pulse sequence and before a subsequent one can occur, a tone generator transmits an AC coded signal on the communication path representing the number of dial pulses counted by the dial pulse detecting arrangement.

10 Claims, 5 Drawing Figures

FIG. 4

| ADDRESS PORTION | CONTROL WORD 0 | | CONTROL WORD 1 | |
|---|---|---|---|---|
| | NEXT ADDRESS PORTION | CONTROL OUTPUT | NEXT ADDRESS PORTION | CONTROL OUTPUT |
| A | A | 0 | B | 0 |
| B | $C_1 + 0$ | R | B | 0 |
| $C_1 + i\ (i=0-13)$ | $C_1 + i + 1$ | 0 | $C_1 + i + 1$ | 0 |
| $C_1 + 14$ | $C_2 + 0$ | 0 | $C_2 + 0$ | 0 |
| $C_2 + i\ (i=0-7)$ | $C_2 + i + 1$ | 0 | B | HR |
| $C_2 + 8$ | $C_3 + 0$ | 0 | B | HR |
| $C_3 + i\ (i=0-17)$ | $C_3 + i + 1$ | 0 | $D_1 + 0$ | H |
| $C_3 + 18$ | $C_4$ | 0 | $D_1 + 0$ | H |
| $C_4$ | A | HR | $D_1 + 0$ | H |
| $D_1 + i\ (i=0-13)$ | A | HR | $D_1 + i + 1$ | 0 |
| $D_1 + 14$ | A | HR | $D_2 + 0$ | 0 |
| $D_2 + i\ (i=0-11)$ | $C_1 + 0$ | P | $D_2 + i + 1$ | 0 |
| $D_2 + 12$ | $C_1 + 0$ | P | $D_3$ | 0 |
| $D_3$ | $C_1 + 0$ | P | $E_1 + 0$ | HR |
| $E_1 + i\ (i=0-33)$ | $E_1 + i + 1$ | T | $E_1 + i + 1$ | T |
| $E_1 + 34$ | $E_2 + 0$ | T | $E_2 + 0$ | T |
| $E_2 + i\ (i=0-24)$ | $E_2 + i + 1$ | 0 | $E_2 + i + 1$ | 0 |
| $E_2 + 25$ | $E_3$ | 0 | $E_3$ | 0 |
| $E_3$ | A | 0 | B | 0 |

DIAL PULSE SIGNALING ARRANGEMENT

TECHNICAL FIELD

This invention relates to subscriber dial pulse signaling systems and more particularly to such systems which convert subscriber dial pulses to AC coded signals for transmission through telephone switching networks.

BACKGROUND OF THE INVENTION

It is sometimes desirable to allow telephone subscribers to transmit signaling information, such as dialed digits, over a previously established communication path through the telephone switching network. For example, when a subscriber with a remote terminal wishes to communicate with a computer via a telephone switching system, it is common for the subscriber to dial information to the computer after the telephone system has completed a communication path between the subscriber's remote terminal and the computer. Many telephone system communication paths, however, include DC blocking at some point therein. If the subscriber has a subscriber set which transmits alternating current (AC) signals to represent dialed digits, he can communicate through a switching system on a communication path of the above type since the AC signals are transmitted through the DC block. Dial pulses, however, are changes in the DC conductivity of the subscriber loop which are blocked by the DC blocking present in telephone communication paths. Accordingly, signaling through the telephone switching network may be denied to rotary dial subscribers who can transmit only dial pulses. It is possible to include an arrangement in a telephone central office which detects dial pulses on the communication path and which transmits on that path coded AC signals representative of the dial pulse sequences. In this manner, subscriber signaling information can be transmitted through or around the DC block contained by the communication path.

Many present day telephone switching systems, however, continually scan the conduction state of communication paths to detect flashes or on-hook indications from subscriber sets. These indications from the subscriber are used by the telephone switching system to control the establishment and maintenance of the communication path. It is possible that sequences of dial pulses will be erroneously detected by a telephone switching system as flash or on-hook indications. The telephone switching system may then disconnect the subscriber or provide the service associated with a flash, e.g., conference or third party calling, when such is not desired.

An arrangement in accordance with the present invention allows rotary dial subscribers to transmit signaling information on a switching system communication path while inhibiting erroneous detection by the switching system of subscriber flash or on-hook signaling.

SUMMARY OF THE INVENTION

A communication system in accordance with the present invention comprises a communication path including two signaling conductors, a signaling arrangement including means for generating sequences of dial pulses by periodically changing the conduction state between the two signaling conductors and a scanning circuit responsive to the conduction state between the two signaling conductors for altering the communication path. The present invention is characterized by including in the above-described communication system, a dial pulse detector responsive to predetermined changes in the conduction state between the two signaling conductors for generating inhibit signals in response to the first dial pulse of each dial pulse sequence generated by the signaling arrangement and an arrangement responsive to the inhibit signals for inhibiting the scanning circuit from detecting the conduction state between the two signaling conductors. In accordance with further aspects of the present invention, the communication system may further include an arrangement for counting the number of dial pulses in each dial pulse sequence, and an arrangement for transmitting on the communication path, AC coded representations of the number of dial pulses counted. Such transmission may advantageously occur in the interval between successive dial pulse sequences.

In accordance with one embodiment of the present invention, a rotary dial subscriber set is connected to a telephone central office by at least two conductors. In response to a first set of dialed digits, the central office establishes a DC conductive path between the subscriber set and a DC blocking trunk circuit. A central office scan arrangement is connected to the communication path to determine the conduction state between the conductors of the communication path in order to maintain or remove the communication path. The embodiment further comprises a dial pulse detector which detects and counts dial pulses in each sequence of dial pulses transmitted from the subscriber set. In response to the first dial pulse of each sequence, the dial pulse detector generates signals which are utilized to inhibit the central office scanner from detecting further dial pulses. This inhibition keeps the central office scanner from erroneously determining that the subscriber has gone on-hook or is generating a flash indication. After each dial pulse sequence and before a subsequent one can occur, a tone generator transmits an AC coded signal on the communication path representing the number of dial pulses counted by the dial pulse detecting arrangement. Also during the interval between dial pulse sequences, the previously inhibited central office scanner is permitted to survey the communication path for possible on-hook or flash indications.

BRIEF DESCRIPTION OF THE DRAWING

The present invention will be more readily understood when the following description is read in conjunction with the drawing wherein

FIG. 4 is a representation of certain control information stored in a control portion of the present embodiment.

DETAILED DESCRIPTION

Figure 1:
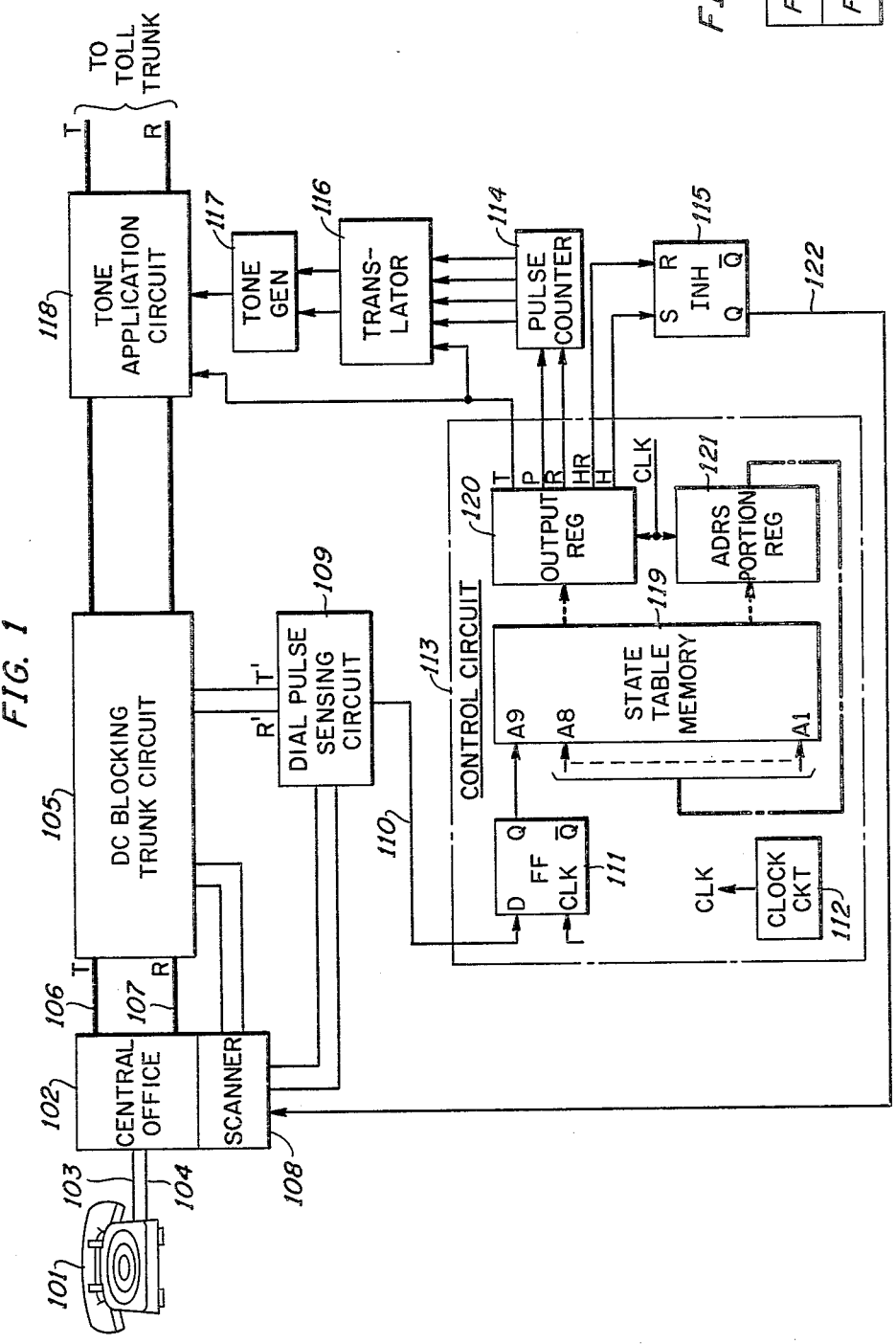
FIG. 1 is a block diagram of an embodiment of the invention.

The arrangement shown in FIG. 1 is an embodiment of the present invention which enables rotary dial subscribers to transmit signaling information on a telephone toll network. This embodiment includes a telephone subscriber set 101 which is connected to a telephone central office 102 via conductors 103 and 104. Subscriber set 101 requests service from central office 102 by going off-hook, which completes a conduction path between conductors 103 and 104. The subscriber's digits are dialed to the central office 102 by periodically breaking and making the conduction path between conductors 103 and 104 in sequences representative of the digits dialed by the subscriber. The central office 102 responds to the request for service and to the sequences of dialed digits by connecting the subscriber's conductors 103 and 104 to a DC blocking trunk circuit 105 via outgoing conductors 106 and 107. It should be noted that DC blocking trunk circuit 105, although shown separated from central office 102, is actually a part of central office equipment. After being connected to trunk circuit 105, a DC conducting circuit exists between subscriber set 101 and the DC blocking trunk circuit 105. The response of the central office to subscriber signaling to connect that subscriber to a trunk circuit is described in detail the *The Bell System Technical Journal,* Volume XLIII, Number 5, Parts 1 and 2, September, 1964.

Central office 102 includes a scanner circuit 108 which is connected to the trunk circuit 105. Scanner 108 checks the DC conduction state of the communication path between trunk circuit 105 and subscriber set 101 once every one hundred milliseconds. When scanner circuit 108 detects an open circuit on this communication path for more than 15 consecutive scan periods (1.5 seconds) the central office determines that the subscriber has gone on-hook and responds by disconnecting the communication path between subscriber 101 and trunk circuit 105. Also, when scanner 108 detects an open circuit on the communication path for greater then five scan periods but less than fourteen, central office 102 determines that a flash indication has been sent from subscriber set 101 and central office responds in accordance with the associated special service.

Rotary dials for use with telephone subscriber sets are standardized to produce dial pulses at the rate of one dial pulse every one hundred milliseconds. Each dial pulse consists of an open circuit between the conductors of approximately 60 milliseconds followed by a closed circuit between the conductors of approximately 40 milliseconds. When a digit is dialed by a rotary dial subscriber, a number of dial pulses is produced on the communication path equal to the number dialed by the subscriber. If the open circuit portion of a dial pulse occurs at the same moment that a scan of that communication path is being performed by scanner 108, that scanner will detect the open circuit condition on the line. Further, since the scan rate of scanner 108 and the dial pulse rate of subscriber set 101 are identical, each subsequent dial pulse open circuit portion will occur at the same time as subsequent scan intervals. Accordingly, scanner 108 will see only the open circuit conditions on the communication path and erroneously interpret these as a continuous open circuit.

The embodiment of FIG. 1 also includes a dial pulse sensing circuit 109 which is connected to the DC blocking trunk circuit 105 to determine the conduction state of the communication path. Accordingly, it is connected to the communication path at a point between the DC blocking portion of trunk circuit 105 and subscriber set 101. Dial pulse sensing circuit 109, in response to certain open circuit conditions on the communication path, transmits a logical "0" on an output conductor 110. As is described in greater detail later herein, certain open circuit conditions are ignored by dial pulse sensing circuit 109. Alternatively, when a closed circuit exists on the communication path, dial pulse sensing circuit 109 transmits a logical "1" on output conductor 110. The signals on output conductor 110 are applied to the D input of a flip-flop 111. The embodiment shown in FIG. 1 further includes the clock circuit 112 which continuously generates timing pulses at the rate of one pulse every two milliseconds. Each timing signal is a logical "1" for approximately one half millisecond. The series of pulses generated by clock circuit 112 is applied to the clock input CLK of flip-flop 111. Flip-flop 111 is the type referred to as a D flip-flop which assumes the logical state applied to its D input at the positive edge of each clock pulse applied to its CLK input.

Figure 5:
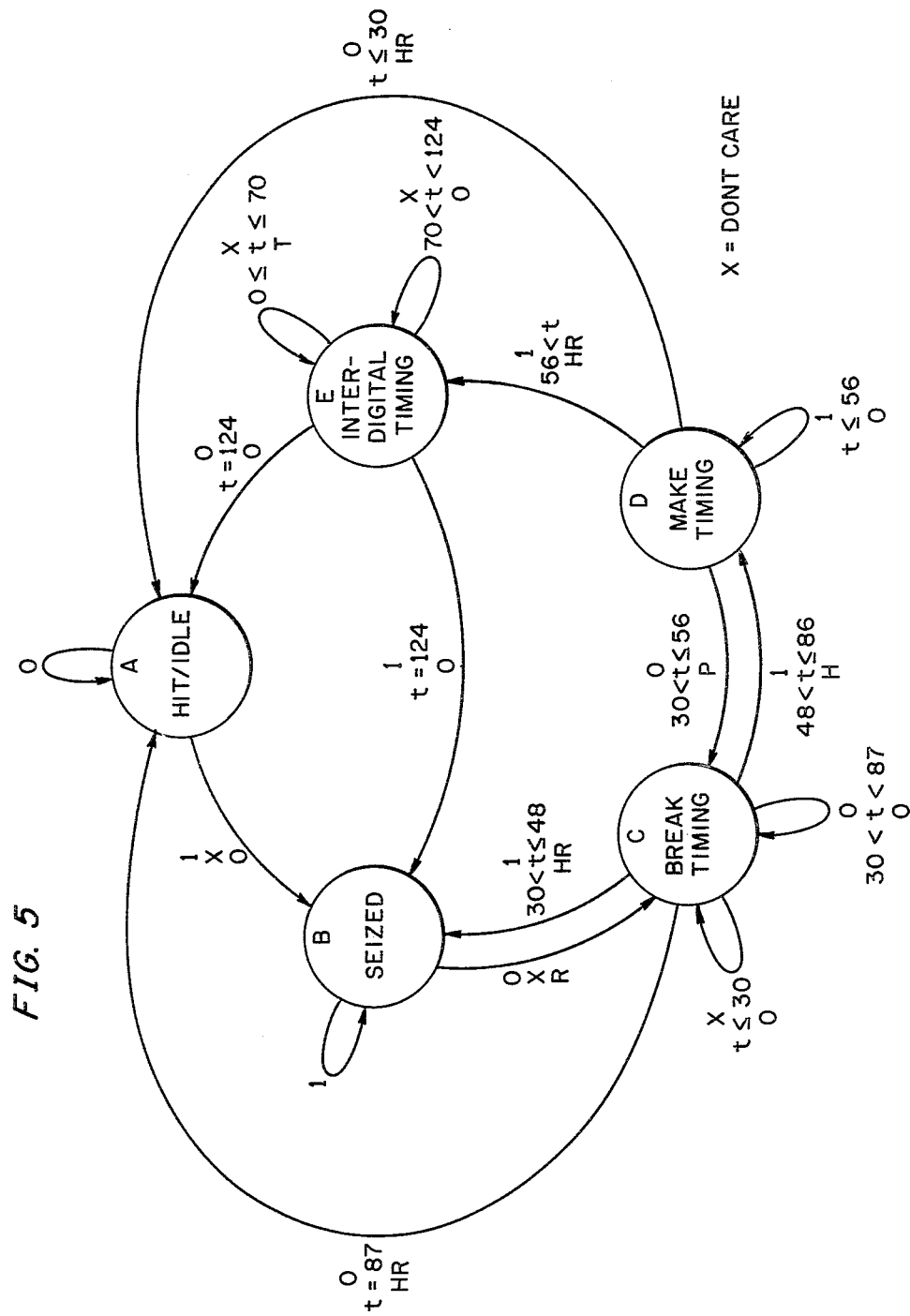
FIG. 5 is a state diagram showing the various states associated with the control portion of the present embodiment.

A control circuit 113 (FIG. 1) is utilized to determine if the changes in conduction state of the communication path are in actuality dial pulses or if they represent line hits or longer indications such as flashes or on-hooks. In order to detect sequences of dial pulses from the telephone subscriber set 101, control circuit 113 times the open circuit and closed circuit conditions detected by dial pulse sensing circuit 109. In the course of the following description, a closed circuit condition between the conductors of the communication path is referred to as a "make" interval and an open circuit condition between those conductors is referred to as a "break" interval. In response to the open and closed circuit conditions of the communication path, control circuit 113 generates a plurality of control signals to implement the detection of dial pulse sequences. FIG. 5 is a state diagram showing the generation of control signals by control circuit 113 in response to possible input conditions. Each state transistion of FIG. 5 has a three-element label. The first element denotes the condition of the flip-flop 111 which will create the state change. The second element of the label is the time (t) during which the change can occur and the third element is the output control signal generated during the state change. It should be noted that the time interval (t) shown by the second element of the label refers to the time elapsed since entry into the state from which the transition is occurring.

Before a subscriber set is connected to trunk circuit 105, the control circuit 113 is in the hit/idle state A in response to the logical "0" input from flip-flop 111. This condition indicates that no loop current is flowing between a telephone subscriber, e.g., 101, and the trunk circuit 105. When an off-hook subscriber set is connected by central office 102 to trunk circuit 105, current flows in the communication path and the input signal from flip-flop 111 becomes a logical "1". Control circuit 113, in response to the logical "1" input from flip-flop 111, changes state to the seized state B (FIG. 5). When the input signal becomes a logical "0" while control circuit 113 is in the seized state B, the control circuit 113 changes to the break timing state C and a two-millisecond logical "1" is transmitted on a conductor R to a pulse counter 114 (FIG. 1). Pulse counter 114 is used to count the pulses of each dial pulse sequence. The logical "1" received by pulse counter 114 on conductor R resets it to zero so that an accurate count will be made of the dial pulses in each sequence. Break timing state C which is utilized to determine if the break interval is within the standards for a dial pulse begins with a thirty-millisecond period during which the input signal from flip-flop 111 is ignored. This thirty-millisecond period keeps certain oscillations which may occur at the conduction to nonconduction state change of the communication path from causing erroneous indications of the conduction state.

The break interval of a dial pulse in the present embodiment should be between forty-eight milliseconds and eighty-six milliseconds. Accordingly, if the input from flip-flop 111 becomes a logical "1" when 30 milliseconds $< t \leq 48$ milliseconds, the break interval is too short for a valid dial pulse and control circuit 113 returns to the seized state B. At each transition from the break timing state C to the seized state B, a logical "1" is transmitted on conductor HR to the reset input of an inhibit flip-flop 115. The use of the logical "1" signal on conductor HR is described in greater detail later herein. When a change of input signal from "0" to "1" occurs during the interval 48 milliseconds $< t \leq 86$ milliseconds, the state of control circuit 113 changes to the make timing state D and a logical "1" is transmitted to the set input of inhibit flip-flop 115 (FIG. 1) via conductor H. The logical "1" transmitted on conductor H sets inhibit flip-flop 115 and indicates that a valid dial pulse has been received. In order to stop the central office scanner 108 from erroneously interpreting a sequence of dial pulses as a flash or an on-hook condition, the output signals from flip-flop 115 are transmitted via a conductor 122 to central office scanner 108 where they are used to inhibit scanning by that scanner. Accordingly, after the receipt of one dial pulse is determined to be valid, the central office scanner 108 is inhibited so that further dial pulses of a dial pulse sequence will not result in modifications of the communication path by the central office scanner 108. When more than eighty-six milliseconds pass in the break timing state C without a logical "1" input signal from flip-flop 111, control circuit 113 returns to the hit/idle state A. At each transition from break timing state C to the hit/idle state A, a logical "1" is transmitted on conductor HR to the reset input of inhibit flip-flop 115. This situation is indicative of an extraneous signal or hit on the line.

During make timing state D (FIG. 3) the logical "1" input signal from flip-flop 111 is timed to determine if the sequence of dial pulses has ended. When the input from flip-flop 111 changes to a logical "0" within thirty milliseconds after the start of the make timing state D, the prior change through states A, B, and C is ignored and control circuit 113 returns to the hit/idle state A. On the return from the make timing state D to the hit/idle state A, a logical "1" signal is generated by control circuit 113 on a conductor HR. The logical "1" on conductor HR is transmitted to the reset input of inhibit flip-flop 115 which responds thereto by resetting. When flip-flop 115 is in the reset state, central office scanner 108 is no longer inhibited so that further changes in conduction state on the communication path will be detected by the scanner. When the input signal from flip-flop 111 changes from a logical "1" to a logical "0" within the time interval 30 milliseconds $< t \leq 56$ milliseconds, the make interval is determined to be proper and the control circuit 113 returns to the break timing state C to time a further dial pulse break interval. At the transition from the make timing state D to the break timing state C, a logical "1" is transmitted to the pulse counter 114 on an output conductor P of control circuit 113. Pulse counter 114 responds to each logical "1" on conductor P by incrementing the present count stored thereby. When the input signal from flip-flop 111 remains a logical "1" after fifty-six milliseconds have passed (56 milliseconds $< t$) in the make timing state D, control circuit 113 determines that the last digit of the present sequence has been received and the state of control circuit 113 changes to the interdigital timing state E. On the transition from the make timing state D to the interdigital timing state E, a logical "1" is transmitted on conductor HR to the reset input of inhibit flip-flop 115. As described above, this resets inhibit flip-flop 115 thereby allowing scanner 108 to detect conduction state changes in the communication path.

Pulse counter 114 increments its count in response to the logical "1" on conductor P at each change from the make timing state D to the break timing state C. Since there is no transition from the make timing state D to the break timing state C for the last dial pulse of any dial pulse sequence, the actual count held in pulse counter 114 will be one less than the total number of dial pulses in a dial pulse sequence. For example, if a sequence of seven dial pulses is received by the embodiment of FIG. 1, control circuit 113 will change from make timing state D to break timing state C six times. There will be no seventh transition from make timing state D to break timing state C. Thus, pulse counter 114 will contain a count of six.

During the interdigital interval, a coded AC signal representative of the number of dial pulses received in the immediately preceding sequence is transmitted on the toll trunk. The coded AC signals are generated by a tone generator 117 and coupled to the toll network via a tone application circuit 118. In the present embodiment, the AC signals transmitted are the well-known type of MF tones utilized in providing TOUCH-TONE service. TOUCH-TONE is a registered service mark of AT&T. Each coded AC signal transmitted from tone generator 117 consists of a unique combination of two frequencies: one frequency selected from a first group of four frequencies and a second frequency selected from a second group of three frequencies. Accordingly, the coded AC signal transmitted from tone generator 117 is defined by applying a one-out-of-four signal and a one-out-of-three signal to tone generator 117.

A translator 116 receives signals representing the pulse count from pulse counter 114 and generates the appropriate one-out-of-four and one-out-of-three signals corresponding to the number of dial pulses in the sequence transmitted from subscriber set 101. It will be remembered that the number of dial pulses transmitted in the sequence is one greater than the number which were counted by pulse counter 114 for which adjustment is made in the translator 116.

As above-described, control circuit 113 changes state from the make timing state to the interdigital state E at the end of each dial pulse sequence. While in state E, a logical "1" is transmitted to the translator 116 via a conductor T. This logical "1" on conductor T is continued for seventy milliseconds. Translator 116 responds to the logical "1" on conductor T by gating to the tone generator 117 the one-out-of-three and the one-out-of-four codes representing the number of dial pulses in the subscriber-dialed dial pulse sequence. The tone generated by tone generator 117 continues for as long as the one-out-of-three and one-out-of-four codes are applied thereto. At the end of seventy milliseconds, control circuit 113 transmits a logical "0" on conductor T which stops tone generator 117. The signals on conductor T may also be applied to the tone application circuit 118 to break the connection in the communication path back to the central office 102 and to complete the connection of tone generator 117 to the toll trunk.

Control circuit 113 remains in the interdigital timing state E for 124 milliseconds. If the input signal from flip-flop 111 is a logical "1" when t equals 124 milliseconds, control circuit 113 changes to the seized state B in preparation for the receipt of a new dial pulse sequence. Alternatively, if the signal from flip-flop 111 is a logical "0" at the time t equals 124 milliseconds, control circuit 113 changes to the hit/idle state A. This last-mentioned state transition would occur, for example, if the subscriber went on-hook.

As described above, control circuit 113 generates output signals in response to the conduction state of the communication path, the present state of the control circuit 113, and the interval of time that control circuit 113 has been in that state. Control circuit 113 (FIG. 1) includes a clock circuit 112, a state table memory 119, an output register 120 and an address portion register 121. State table memory 119 stores a plurality of control words, each comprising a control portion defining which output signals are to be generated, and an address portion utilized in defining the next state of control circuit 113. Control words are read from state table memory 119 in response to a nine-bit memory address. When a control word is read from the memory, the control portion is applied to the input terminals of output register 120 and the address portion is applied to the input terminals of address portion register 121 (FIG. 1). The control and address portions are stored in their associated registers 120 and 121 at the falling edge of the logical "1" clock pulses from clock circuit 112. It will be remembered that clock circuit 112 generates logical "1" clock pulses at the rate of one clock pulse every two milliseconds where each clock pulse is a logical "1" for approximately 0.5 milliseconds.

The contents of address portion register 121 comprise the first eight digits of the next address for state table memory 119. The output signal of flip-flop 111 in the ninth bit of this address. Accordingly, each address portion of a control word points of two possible states. A first one of these states is stored at zero $(0 \times 2^8)$ plus the address portion and the second is stored at 256 $(1 \times 2^8)$ plus the address portion. FIG. 4 represents the two control words defined by each possible eight-bit address portion. The control portion of each control word comprises a five-digit binary word. Each digit is uniquely associated with one of the output conductors T, P, R, HR, and H. Accordingly, logical "1" or "0" output signals are transmitted on these output conductors by storing the appropriate logical signal in the digit position associated with the output conductor. For example, when a logical "1" is to be transmitted on conductor H only a logical "1" is stored in the digit position associated with output conductor H and logical "0s" are stored in the other digit positions.

FIG. 4 is arranged in three major columns labeled address portion, control word 0 and control word 1. Each row of FIG. 4 includes an address portion and the two control words which can be read from state table memory 119 when the associated address portion is stored in address portion register 121. The particular one of the two control words read is determined by the input signal from flip-flop 111. For a given address portion in address register 121, control word 0 will be read from state table memory 119 when the input signal from flip-flop 111 is a logical "0" and control word 1 will be read from state table memory 119 when the input signal from flip-flop 111 is a logical "1". Each address portion shown in FIG. 4 includes one of the capital letters A through E. This capital letter denotes which of the states of control circuit 113, as shown in FIG. 5, is associated with the address portion. For example, address portion A is associated with the hit/idle state A of FIG. 5 and an address portion $C_3+i$ is associated with the break timing state C of FIG. 5. Certain address portions in FIG. 4 are written as a subscripted letter plus i, followed by a parenthetical definition of the range of i. For example, $C_2+i$ (i=0–7) indicates that there are eight sequentially stored control words at the locations represented by $C_2+0$ through $C_2+7$. Further, a next address portion, which is one greater than its storage location, e.g., $C_2+i+1$ represents that each control word of a sequence refers to the immediately subsequent location in that sequence.

The following is a description of the use of state table memory 119 in the previously described generation of control signals. When control circuit 113 is in the hit/idle state A, address portion A (FIG. 4) is stored in the address portion register 121. Control circuit 113 remains in the hit/idle state A so long as the input signal from flip-flop 111 stays a logical "0" since each address portion written into address portion register 121 is equal to A and the ninth address bit is a logical "0". When the input signal from flip-flop 111 becomes a logical "1", the control word 1 associated with address portion A is accessed from state table memory 119. This control word has an address portion of B, thereby changing the state of control circuit 113 to the seized state B. So long as the input from flip-flop 111 remains a logical "1" control circuit 113 will remain in the seized state B since each control word 1 associated with address portion B also has a next address portion equal to B. When the input from flip-flop 111 becomes a logical "0", control word 0 associated with address portion B is accessed from state table memory 119. This control word has an address portion $C_1+0$ which is the first address associated with the break timing state C. As shown in FIG. 4, a logical "1" output signal is generated on conductor R during the transition from state B to state C.

Break timing state C begins with a substate $C_1$ which produces a 30 millisecond period during which the inputs from flip-flop 111 are ignored. Substate $C_1$ of break timing state C comprises fifteen control words at addresses defined by address portions $C_1+0$ through $C_1+14$ which are sequentially read from state table memory 119 at the rate of one control word every two milliseconds. In the $C_1$ substate, each control word read from state table memory 119, regardless of the input signals from flip-flop 111, includes an address portion pointing to the next address portion in substate $C_1$ until the control word having an address portion of $C_1+14$ is accessed. The address portion of control word $C_1+14$ points to the first address portion of a substate $C_2$ of break timing state C. From the above, it can be seen that fifteen control words will be accessed from state table memory 119 at the rate of one control word every two milliseconds regardless of the input signals from flip-flop 111. Accordingly, control circuit 113 will "wait" for thirty milliseconds when entering the break timing state C. Substate $C_2$ is commenced directly from substate $C_1$. When the input signal from flip-flop 111 becomes a logical "1" at any time during substate $C_2$, control word 1 having an address portion B, and a control portion having a logical "1" in the digit position associated with conductor HR is accessed. In response to the address portion B, control circuit 113 will return to the seized state B. Alternatively, if the input from flip-flop 111 remains a logical "0" during the $C_2$ substate, nine consecutive control words ($C_2+0$ through $C_2+8$) will be read from state table memory 119 at the rate of one control word every two milliseconds. The control word 0 associated with address portion $C_2+8$ includes an address portion $C_3+0$. Control circuit 113, accordingly, changes, from the $C_2$ substate to the $C_3$ substate approximately 48 milliseconds after entering the break timing state C when the input signal from flip-flop 111 remains a logical "0". The remaining transitions through state table memory 119 continue as above described in response to the present state of the control circuit 113, the amount of time that control circuit 113 has been in that state and the present output signal from flip-flop 111.

Figure 2:
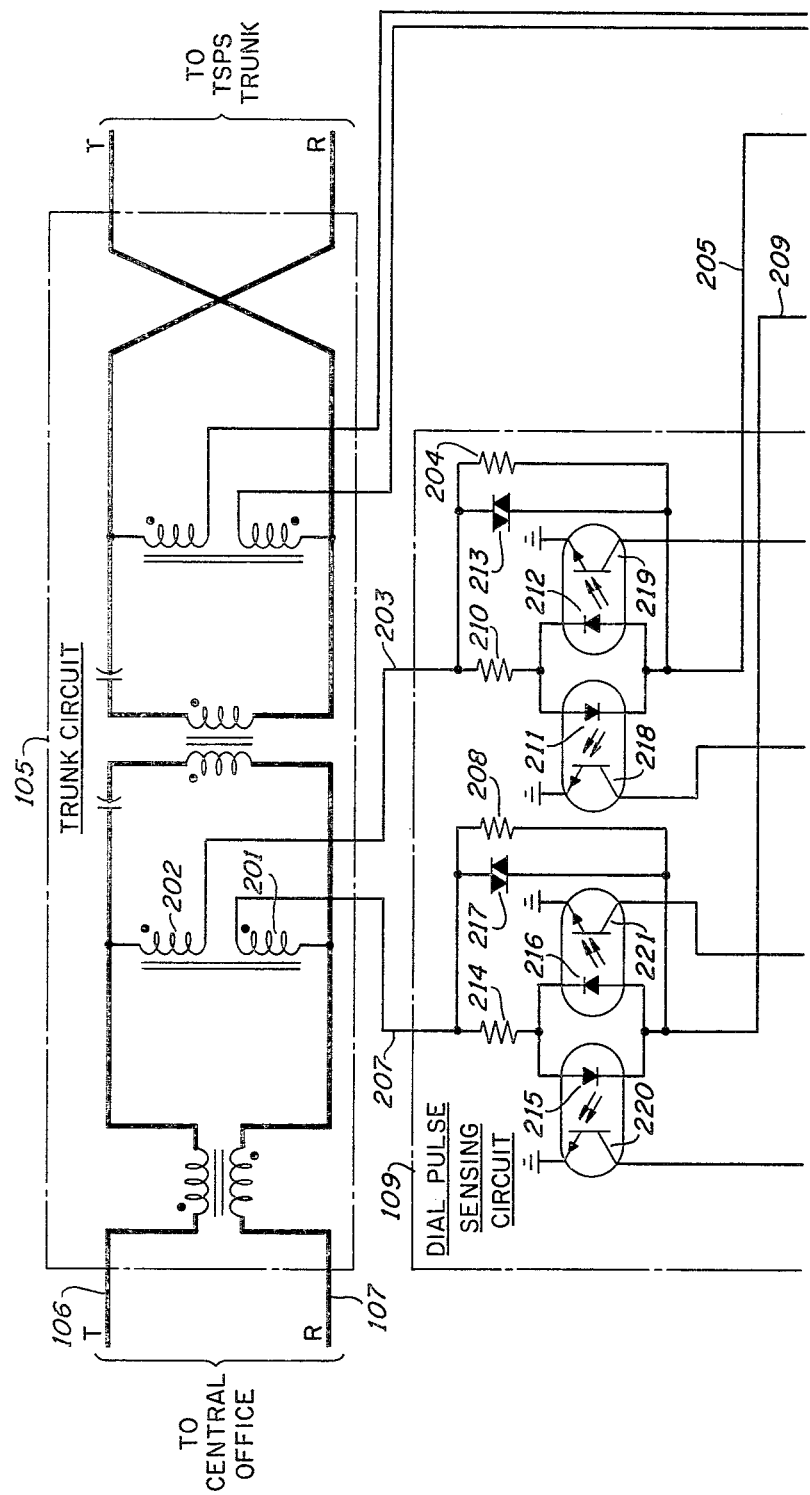
FIGS. 2 and 3 when arranged in accordance with FIG. 6 comprise a more detailed circuit drawing of certain portions of the embodiment of FIG. 1.
Figure 3:
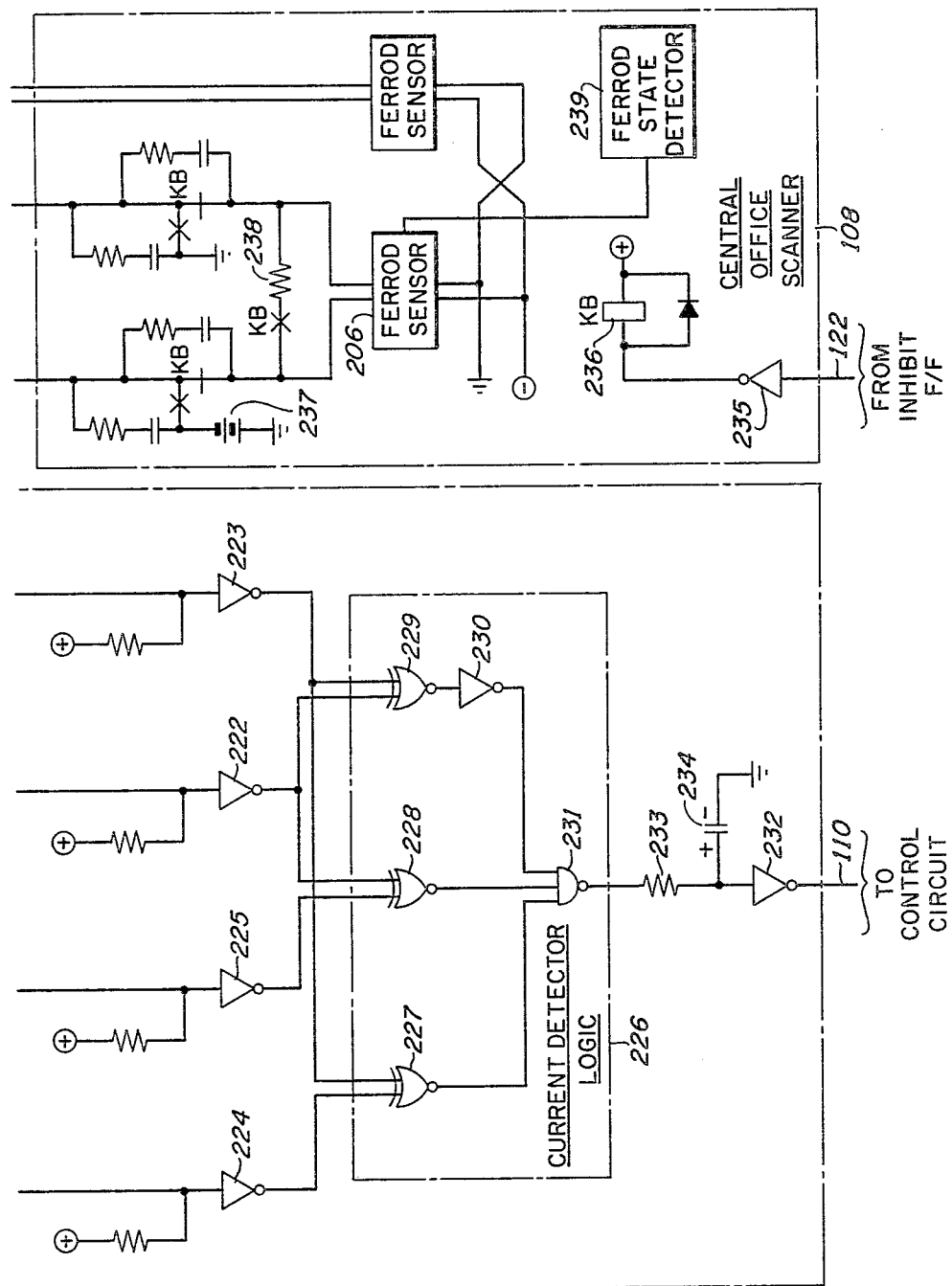

FIGS. 2 and 3, when arranged in accordance with FIG. 6, comprise a more detailed diagram of the association of trunk circuit 105, dial pulse sensing circuit 109, and relevant portions of the central office scanner 108. In this embodiment, trunk circuit 105 and the associated central office scanning circuit 108 are of the type used in electronic switching systems as described in *The Bell System Technical Journal*, Volume XLIII, Number 5, Parts 1 and 2.

The battery feed loop for trunk circuit 105 is connected through a ferrod sensor 206. When current flows in the battery feed loop, ferrod sensor 206 will be in a first state and, when no current flows, ferrod sensor 206 will be in a second state. A ferrod state detector 239 scans ferrod sensor 206 once every 100 milliseconds to determine which of the two possible states that ferrod sensor 206 is in. The state of ferrod sensor 206 at each scan interval is transmitted to central office 102 which controls the communication path based upon this information.

As shown in FIGS. 2 and 3, ground is connected to conductor 106 over a path comprising a coil 202, a conductor 203, a resistor 204, a conductor 205 and the ferrod sensor 206. Similarly, conductor 107 is connected to a negative voltage via a coil 201, conductor 207, a resistor 208, a conductor 209, and the ferrod sensor 206. The particular value of resistors 204 and 208 is selected to limit the maximum current flow in the communication path to the requirements of individual circuit arrangements. Connected in parallel with resistor 204, is the serially connected combination of a resistor 210 and the parallel combination of two oppositely polarized light-emitting diodes 211 and 212. It will be noted that a portion of any current flowing between the central office scanner 108 and conductor 106 will flow through one or the other of light-emitting diodes 211 and 212. The amount of this current is determined by the amount of current on conductor 106 and the ratio of the values of resistors 204 and 210. A varistor 213 is connected in parallel with resistor 204 to protect the light-emitting diodes 211 and 212 from excessive voltage. Connected in parallel with resistor 208 is the serially connected combination of a resistor 214 and the parallel combination of two oppositely polarized light-emitting diodes 215 and 216. As in the case with light-emitting diodes 211 and 212, the amount of current flowing through light-emitting diode 215 or 216 will be determined by the amount of current on conductor 107 and the ratio of the value of resistors 214 and 208. Further, a varistor 217 is connected in parallel with resistor 208 to protect light-emitting diodes 215 and 216 from excessive voltages.

Each light-emitting diode 211, 212, 215, and 216 is optically coupled to a respective one of four NPN phototransistors 218, 219, 220 and 221. The emitters of all phototransistors 218, 219, 220, and 221 are connected to ground and their collectors are connected to a positive voltage supply via a uniquely associated one of four collector resistors. The collector voltage level of each phototransistor 218, 219, 220, and 221 is applied as an input to a respective one of four inverters 222, 223, 224, and 225. It has been found desirable to utilize circuits having a fixed input signal threshold before a change of output signal is generated as inverters 222, 223, 224 and 225. Such circuits can be implemented by preceding each of the inverters 222, 223, 224, and 225 with a Schmitt trigger circuit. When no light impinges on a given phototransistor, its effective resistance is relatively high, resulting in a relatively high positive voltage occurring at its collector and, accordingly, at the input of the inverter associated therewith. On the other hand, when light does strike a given phototransistor, its effective resistance decreases, resulting in a relatively low voltage being applied to the input of its associated inverter. In accordance with the present embodiment, the relatively high voltage input to an inverter is a logical "1" while the relatively low voltage input is a logical "0". Accordingly, the output of an inverter associated with a given light-emitting diode which is receiving light will be a logical "1" while the output of an inverter associated with a light-emitting diode which is not receiving light will be a logical "0".

When conductors 106 and 107 are connected to an off-hook subscriber set, e.g., 101, current flows from central office scanner 108 to the conductor 106 and returns to the central office scanner 108 from conductor 107. A portion of the current flowing on conductor 106 will pass through light-emitting diode 212 and resistor 210 and a portion of the current on conductor 107 will flow through light-emitting diode 215 and resistor 214. Light-emitting diodes 212 and 215 respond to the passage of current therethrough by emitting light, which is optically coupled to their associated phototransistors 219 and 220. No light will be emitted by light-emitting diodes 211 and 216 which are polarized in reverse to the flow of current. In response to current flow through light-emitting diodes 212 and 215 and no current flow through light-emitting diodes 211 and 216, inverters 223 and 224 have logical "1" output signals and inverters 222 and 225 have logical "0" output signals. If the polarity of the applied battery supply is reversed, a loop current will flow through light-emitting diodes 211 and 216 only. Current through light-emitting diodes 211 and 216 only, results in inverters 222 and 225 having logical "1" output signals while inverters 223 and 224 have logical "0" output signals.

The output signals from inverters 222, 223, 224, and 225 are transmitted to a current detector logic circuit 226. Current detector logic circuit 226 comprises three EXCLUSIVE NOR circuits 227, 228, and 229, an inverter 230, and a NAND gate 231. EXCLUSIVE NOR circuit 227 receives as input signals the output signals from inverter 224 and inverter 223. EXCLUSIVE NOR circuit 228 receives as input signals the output signals from inverter 222 and inverter 225. EXCLUSIVE NOR circuit 229 receives as input signals the output signals from inverter 222 and inverter 223. The output signals from EXCLUSIVE NOR circuits 227 and 228 are directly connected as inputs to NAND gate 231. The output signals from EXCLUSIVE NOR circuit 229 are connected via inverter 230 to NAND gate 231. Table 1 is a truth table showing the logic function performed by current detector logic circuit 226.

Table 1

| Signal from Inverters | | | | Logic CCT 226 Output |
|---|---|---|---|---|
| 222 | 223 | 224 | 225 | |
| 0 | 0 | 0 | 0 | 1 |
| 0 | 0 | 0 | 1 | 1 |
| 0 | 0 | 1 | 0 | 1 |
| 0 | 0 | 1 | 1 | 1 |
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

From Table 1, it is apparent that only two conditions result in a logical "0" output of NAND gate 231. A first of these conditions occurs in response to a loop current of a first direction and the second condition occurs in response to a loop current flowing in the opposite direction. Accordingly, only a true loop current regardless of its polarity will result in a logical "0" output signal from NAND gate 231.

The light-emitting diodes of the present embodiment respond very rapidly to changes in current. It has been found desirable to require that any change of current flow on the communication path exist for a predetermined period of time before the change is transmitted to flip-flop 111 (FIG. 1) on output conductor 110. This result is achieved by connecting the output of NAND gate 231 to an inverter 232 via a resistor 233. Further, a capacitor 234 is connected between the input of inverter 232 and ground. Whenever the output of NAND gate 231 changes state, the capacitor 234 must charge or discharge via resistor 233. This holds the output of NAND gate 231 relatively constant for the predetermined period of time before the state change is reflected at the output of inverter 232. The particular values for resistor 233 and capacitor 234 can be determined in the manner well known in the art to achieve the chosen predetermined period of time. A three-millisecond time period has been found to yield satisfactory results.

As previously described, the central office controls the communication path based on the current flow it detects on that communication path via ferrod sensor 206. In accordance with the principles of the present invention, it is desirable during periods of dial pulse reception to inhibit the central office from detecting changes of state on the communication path and thereby protect the central office from erroneously responding to these dial pulses. As previously described, whenever the inhibit flip-flop 115 (FIG. 1) is set in response to a signal H from control circuit 113, logical "1" output signal is generated on a conductor 122. This logical "1" output on conductor 122 is transmitted to the scanner 108. As shown in more detail in FIG. 2, the signal on conductor 122 is applied as an input to an inverter 235. Whenever the output of inverter 235 goes to the zero state, a relay KB is activated. The activation of the relay KB reverses the contacts from the states shown on FIG. 3. The reversal of the relay contacts KB connects a negative voltage supply 237 to conductor 209 and removes the negative voltage supply normally applied to conductor 107 through the ferrod sensor 206. Further, it applies ground to conductor 205 while removing the ground normally connected to conductor 205 via the ferrod sensor 206. The activation of relay KB also completes a circuit to effectively substitute the resistor 238 for the load previously provided by the communication path. While in this state, current continues to flow through the ferrod sensor 206 via resistor 238, thus keeping the ferrod sensor 206 in a state associated with an off-hook subscriber. Maintaining the ferrod sensor 206 in this state effectively inhibits the central office scanner from detecting further signaling on the communication path until the relay KB is again deactivated.

What is claimed is:

1. A communication system comprising a communication path comprising two signaling conductors, signaling means for generating sequences of dial pulses by periodically changing the conduction state between said two signaling conductors and scanning means responsive to the conduction state between said two signaling conductors for altering said communication path characterized in that said communication system further comprises:
   dial pulse detection means responsive to predetermined changes in the conduction state between said two signaling conductors for generating inhibit signals in response to the first dial pulse of each dial pulse sequence generated by said signaling means; and
   inhibiting means responsive to said inhibit signals for inhibiting said scanning means from detecting the conduction state between said two signaling conductors.

2. The communication system in accordance with claim 1 further characterized in that said dial pulse detection means comprises
   means for generating interdigital state signals at the end of each sequence of dial pulses generated by said signaling means; and
   means for terminating the generation of said inhibit signals in response to said interdigital state signals.

3. The communication system in accordance with claim 1 further characterized in that
   said dial pulse detection means comprises means for generating dial pulse count signals representative of the number of dial pulses in each sequence of dial pulses generated by said signaling means; and
   said communication system further comprises transmitting means responsive to said dial pulse count signals for transmitting on said communication path AC coded signals representative of the number of dial pulses generated by said signaling means.

4. The communication system in accordance with claim 3 further characterized in that
   said dial pulse detection means comprises means for generating interdigital state signals at the end of each sequence of dial pulses generated by said signaling means and means responsive to said interdigital state signals for generating gating signals; and
   said transmitting means further comprises means responsive to said gating signals for transmitting on said communication path said AC coded signals.

5. The communication system in accordance with claim 1 wherein said scanning means further comprises a voltage source comprising first and second output terminals connected to a respective one of a first and a second one of said two signaling conductors and current sensing means electrically coupled to at least one of said two signaling conductors for determining the conduction state between said two signaling conductors by sensing the presence of a current exceeding a predetermined magnitude or the absence of such current on said at least one of said two signaling conductors characterized in that said inhibiting means further comprises:

means responsive to said inhibit signals for removing the electrical coupling between said current sensing means and said at least one of said two signaling conductors while electrically coupling to said current sensing means an arrangement for carrying a current exceeding said predetermined magnitude.

6. The communication system in accordance with claim 1 wherein said communication system further comprises a DC voltage source comprising a first output terminal and a second output terminal connected to a respective one of a first and a second one of said two signaling conductors further characterized in that said dial pulse detection means further comprises first current detection means connected in series with a first one of said two signaling conductors between said DC voltage source and said signaling means for generating a first output signal in response to a current flowing toward said signaling means and a second output signal in response to a current flowing from said signaling means;

second current detection means connected in series with the second one of said two signaling conductors between said voltage source and said signaling means for generating a third output signal in response to a current flowing toward said signaling means and a fourth output signal in response to a current flowing from said signaling means;

logic circuit means for generating closed circuit indicating signals indicating a closed circuit conduction state between said two signaling conductors only in response to the substantially simultaneous occurrence of said first and said fourth output signals in the absence of said second and said third output signals and in response to the substantially simultaneous occurrence of said second and said third output signals in the absence of said first and said fourth output signals; and means responsive to said closed circuit indicating signals for generating said inhibit signals.

7. The communication system in accordance with claim 6 further characterized in that said first current detection means comprises a first light-emitting diode polarized to pass current flowing from said DC voltage source to said signaling means and optically coupled to an arrangement for generating said first output signal in response to the emission of light by said first light-emitting diode and a second light-emitting diode polarized to pass current flowing from said signaling means to said voltage source and optically coupled to an arrangement for generating said second output signal in response to the emission of light by said second light-emitting diode; and said second current detection means comprises a third light-emitting diode polarized to pass current flowing from said voltage source to said signaling means and optically coupled to an arrangement for generating said third output signal in response to the emission of light by said third light-emitting diode and a fourth light-emitting diode polarized to pass current flowing from said signaling means to said DC voltage source and optically coupled to an arrangement for generating said fourth output signal in response to the emission of light by said fourth light-emitting diode.

8. A telecommunication system comprising two signaling paths and means for blocking the transmission of dial pulses at a predetermined location on said two signaling paths; a subscriber set connected to said two signaling paths for transmitting sequences of dial pulses, by changing the conduction state between said two signaling paths, and control means connected to said two signaling paths between said subscriber set and said means for blocking dial pulses, said control means being responsive to the conduction state between said two signaling paths for altering said two signaling paths characterized in that said telecommunication system further comprises dial pulse detection means connected to said two signaling paths between said subscriber set and said means for blocking dial pulses for detecting and counting the dial pulses of each of said sequences of dial pulses transmitted from said subscriber set and for generating an inhibit signal in response to the first dial pulse of each sequence of dial pulses transmitted by said subscriber set;

inhibit means responsive to said inhibit signals for inhibiting said control means from responding to said dial pulses; and transmitting means for transmitting on said two signaling paths a coded AC signal representative of the number of pulses in each sequence of dial pulses counted by said dial pulse detection means.

9. The telecommunication system, in accordance with claim 8 characterized in that said telecommunication system further comprises means for generating interdigital state signals at the end of each sequence of dial pulses transmitted by said subscriber set; and said transmitting means further comprises means responsive to said interdigital state signals for transmitting on said two signaling paths said AC coded signals.

10. The telecommunication system in accordance with claim 9 characterized in that said dial pulse detection means further comprises means responsive to said interdigital state signals for terminating the generation of said inhibit signals.

* * * * *